Oct. 26, 1937.  C. F. KRUMHAR ET AL  2,097,332
MOUNTING FOR BUS SEATS
Original Filed Dec. 29, 1934

Inventors
HARRY H. HAINES
& CARL F. KRUMHAR

By

Attorneys

Patented Oct. 26, 1937

2,097,332

UNITED STATES PATENT OFFICE 2,097,332

MOUNTING FOR BUS SEATS

Carl F. Krumhar, Kent, and Harry H. Haines, Akron, Ohio, assignors to Tru-Car, Inc., Kent, Ohio, a corporation of Ohio Original application December 29, 1934, Serial No. 759,732. Divided and this application July 7, 1936, Serial No. 89,350

5 Claims. (Cl. 45—137)

This invention relates to mounting or supporting devices, and more particularly to a shock and vibration absorbing mounting for vehicle seats.

This application is a division of our prior application Serial No. 759,732, filed December 29, 1934.

The general object of our invention is to provide a resilient vibration and shock absorbing mounting device which can be readily installed and economically manufactured. More specifically, an object of our invention is to provide a shock and vibration absorbing mounting for bus seats whereby the seats can be readily secured to the floor of a bus and which will function to prevent the transmission of vibrations and shocks from the floor to the bus seat. Another object of our invention is to provide such a mounting device wherein there is no metallic contact between the frame of the bus seat and the floor.

Figure 1:
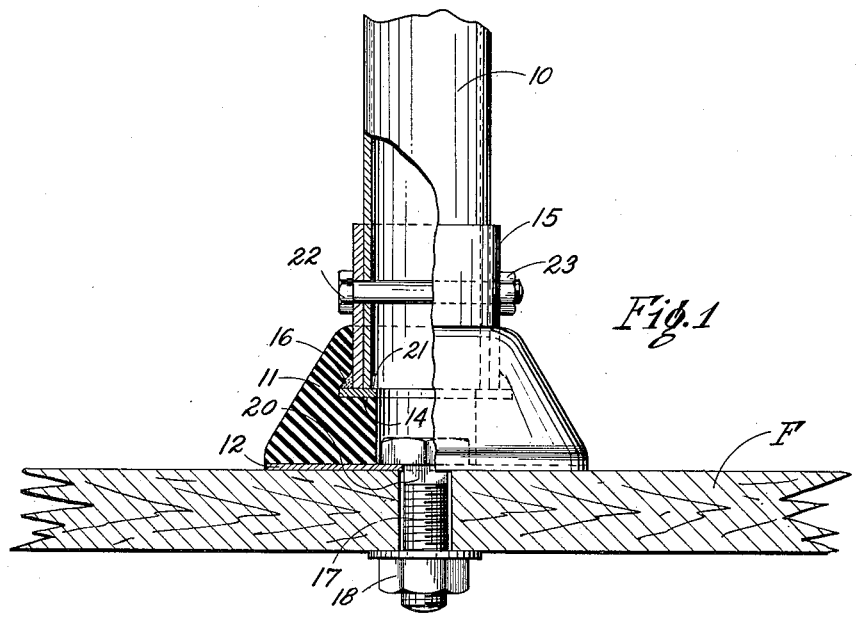
Figure 2:
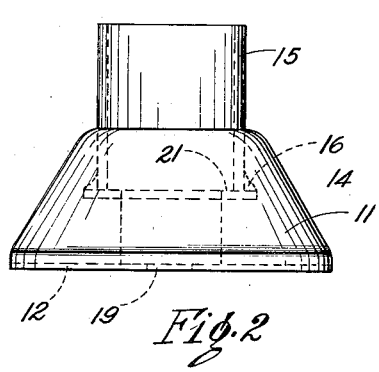
Figure 3:
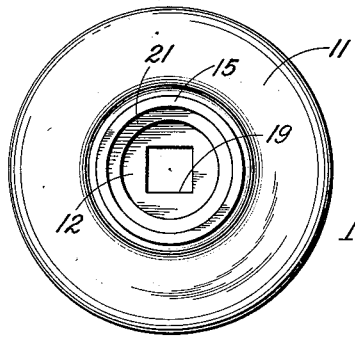
Figure 4:
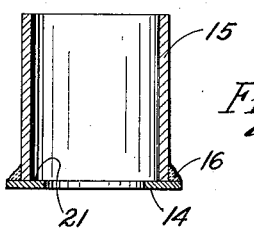

Further objects and advantages of our invention will become apparent from the following description of a preferred form thereof, reference being made to the accompanying drawing, wherein: Figure 1 is an elevation partially in section illustrating our mounting device as applied to a bus seat having a tubular frame; Figure 2 is an elevation of the device before installation; Figure 3 is a plan view of the device illustrated in Figure 2; and Figure 4 is a sectional view of the mounting member to which the tubular leg member may be secured.

As shown in Figure 1, our device is particularly adapted for securing a tubular member 10, such as a bus seat leg of the character illustrated in detail in our prior application, to a bus floor indicated at F. The mounting member preferably comprises a live rubber collar 11 having vulcanized thereto a metal plate 12 and having molded and/or vulcanized therein the cup-like assembly illustrated particularly in Figure 4 and comprising a washer or perforated plate 14 to which a sleeve 15 may be secured as by arc welding, the weld being indicated at 16.

The plate 12, washer or plate 14 and sleeve 15 are preferably made of steel, and before vulcanizing these members may be suitably coated with brass or copper in a manner known to those skilled in the art, so that when the collar 11 is molded and vulcanized a secure connection will be made between the rubber of the collar and the metallic members.

The mounting device may conveniently be secured to the floor F by means of a carriage bolt 17 and a nut 18, the plate 12 being provided with a square opening 19, so that the square shank 20 of the carriage bolt will not turn when the nut 18 is tightened.

In order to conveniently secure the tubular leg member 10 to the sleeve 15, the sleeve is dimensioned so that the leg will fit within it closely, and so that the end of the leg will rest on the shoulder 21 formed by the inwardly projecting portion of the plate or washer 14. The leg is then secured to the sleeve by a bolt 22 passing through aligned apertures in the sleeve and the leg and fastened by a nut 23. We prefer to drill the registering openings in the sleeve and leg after the mounting members have been installed in the vehicle and the legs positioned therein, so that the necessary openings can be drilled in a single operation.

If desired the sleeve 15 can be split so that the bolt 22 will exert a clamping action thereon to firmly clamp the leg therein, but ordinarily this is unnecessary because it is possible to obtain commercial tubing of sufficiently accurate dimensions to obtain a snug fit without employing a slotted sleeve.

It will be seen that by our mounting a block of live resilient rubber or other similar material is interposed between the floor of the vehicle and the leg of the chair mounted therein. There is no metallic contact between the vehicle floor and the chair frame, and by this construction many of the vibrations present in the floor are absorbed by the rubber and not transmitted to the bus seat. The mounting is such that not only are vertical vibrations absorbed, but the sleeve and the leg mounted therein may oscillate slightly with respect to the floor and the plate 12 so that many of the fore and aft vibrations and shocks will be absorbed.

The mounting is particularly efficient in absorbing the vibrations of high frequency and of relatively small magnitude which are present in the floors of all present day busses, and which impose severe strains on the bus seats. These vibrations which are in large part absorbed by our mounting have in the past made it impractical to employ bus seats having tubular frames because of the crystallization of the frames and ultimate failure thereof. By employing our mounting devices it is possible to construct bus frames of light gauge steel tubing without fear of failure of the frame by reason of crystallization of the metal.

Preferably we employ one of our mounting devices with each leg of the bus seat. Inasmuch as each mounting device may be secured to the bus floor by a single carriage bolt, it will be evident that the installation of our mounting devices is extremely simple and can be carried out very rapidly.

In the foregoing specification we have described our invention particularly as applied to a mounting for bus seats having tubular frames. It will be evident to those skilled in the art that the mounting device can be employed for other purposes. For example, it may be advantageously used to support the vertical stanchions or hand rails frequently employed in city busses. When used for this purpose the mounting devices may be employed at both ends of the stanchions or the like, for instance, in the ceiling and floor of the bus, and are particularly advantageous in that they permit the body of the bus to weave without imposing any substantial stresses on the stanchions.

It will also be apparent to those skilled in the art that our device may be employed for mounting other than tubular members. It is therefore to be understood that our patent is not limited to the preferred form of our invention described herein or in any manner other than by the appended claims when given the range of equivalents to which our patent may be entitled.

We claim:

1. In combination, a chair leg, a supporting surface and means to secure said chair leg to said supporting surface comprising a metallic disc in contact with and secured to said surface, a rubber cushion vulcanized to said disc, a cup-like member arranged partly within said cushion and vulcanized thereto, said cup-like member projecting beyond the upper surface of said cushion and proportioned to receive said chair leg, and fastening means extending through said cup-like member and said chair leg.

2. In combination, a chair leg, a supporting surface and means to secure said chair leg to said supporting surface comprising a metallic disc in contact with and secured to said surface, a rubber cushion member vulcanized to said disc, a cup-like member comprising a disc embedded in said cushion member and a sleeve welded to said disc and projecting from the cushion member, said sleeve proportioned to receive and surround said chair leg, said disc serving as a support for the bottom surface of said chair leg, aligned apertures formed in said chair leg and said sleeve in that portion of the sleeve which projects beyond the cushion, and fastening means extending transversely through said aligned apertures.

3. In combination, a chair leg, a cushion support therefor and a supporting surface, said cushion support comprising an apertured disc in contact with said surface, a bolt anchored to said disc and projecting into said surface for securement thereto, a rubber cushion member vulcanized to said disc, said cushion member apertured above said bolt to facilitate the insertion of same, a second disc spaced from and parallel to said first disc and embedded in said rubber cushion, a tubular sleeve concentric with respect to said apertures welded to said embedded disc and proportioned to project beyond the rubber cushion, aligned apertures formed in said projecting sleeve portion and said chair leg and fastening means extending transversely therethrough.

4. Means for anchoring a chair to a supporting surface comprising a rubber cushion member having a metallic disc vulcanized to the under side thereof, said metallic disc provided with an aperture to receive the shank of a headed fastening bolt extending through said aperture and into said supporting surface, a second metallic disc spaced from and parallel to said first disc, said second metallic disc being provided with an aperture concentric with the aperture in said first disc and the aperture of said second disc exceeding the diameter of the aperture in the first disc to facilitate the passage therethrough of said headed bolt, a metallic sleeve welded to said second disc and proportioned to extend upwardly beyond the upper surface of said rubber cushion, the internal diameter of said sleeve exceeding the diameter of the aperture in said second disc whereby an annular supporting ledge is formed within said cushion, said sleeve proportioned to receive a chair leg, and the lower surface of said chair leg adapted to abut said supporting ledge.

5. Means for anchoring a chair to a supporting surface comprising a rubber cushion member having a metallic disc vulcanized to the under side thereof, said metallic disc provided with an aperture to receive the shank of a headed fastening bolt extending through said aperture and into said supporting surface, a second metallic disc spaced from and parallel to said first disc, said second metallic disc being provided with an aperture concentric with the aperture in said first disc and the aperture of said second disc exceeding the diameter of the aperture in the first disc to facilitate the passage therethrough of said headed bolt, a metallic sleeve welded to said second disc and proportioned to extend upwardly beyond the upper surface of said rubber cushion, the internal diameter of said sleeve exceeding the diameter of the aperture in said second disc whereby an annular supporting ledge is formed within said cushion, said sleeve proportioned to receive a chair leg, the lower surface of said chair leg adapted to abut said supporting ledge, aligned apertures formed in said sleeve and chair leg and fastening means extending through said apertures to prevent withdrawal of the chair leg from said sleeve.

CARL F. KRUMHAR.
HARRY H. HAINES.